United States Patent [19]

Hurnik et al.

[11] Patent Number: 5,243,013
[45] Date of Patent: Sep. 7, 1993

[54] POLYESTER POLYOLS AND THEIR USE AS ANCHORING AGENTS FOR POLYMER SYSTEMS AND AS POLYMERIC PLASTICIZERS

[75] Inventors: Helmut Hurnik, Leverkusen; Gerhard Trümmelmeyer, Leichlingen; Adolf Winkler, Leverkusen, all of Fed. Rep. of Germany

[73] Assignee: Bayer Aktiengesellschaft, Leverkusen, Fed. Rep. of Germany

[21] Appl. No.: 873,814

[22] Filed: Apr. 27, 1992

[30] Foreign Application Priority Data

May 7, 1991 [DE] Fed. Rep. of Germany ....... 4114800

[51] Int. Cl.$^5$ .............................................. C08G 18/42
[52] U.S. Cl. ........................................ 528/80; 528/81; 528/83; 528/296; 252/182.24; 560/94
[58] Field of Search ................ 560/94; 252/182.24; 528/80, 81, 296

[56] References Cited

U.S. PATENT DOCUMENTS 4,101,530  7/1978  Burkhardt et al. ................... 528/60

FOREIGN PATENT DOCUMENTS 0150803   8/1985  European Pat. Off. .
WO8300155 2/1983  PCT Int'l Appl. .
WO8911497 11/1989 PCT Int'l Appl. .

Primary Examiner—John Kight, III
Assistant Examiner—Rachel Johnson
Attorney, Agent, or Firm—Connolly and Hutz

[57] ABSTRACT

The new polyester polyols, which have an acid value below 10, a hydroxyl value of 50 to 200, a hydroxyl functionality above 2 and a number average molecular weight $M_n$ of 800 to 5,000 and which are liquid at 23° C. or are homogeneously soluble in di-2-ethylhexyl phthalate in a concentration of at least 70% by weight, the viscosity of the 70% solution being from 1 to 35 Pa.s, are used as anchoring agents for polymer systems and as polymeric plasticizers.

12 Claims, No Drawings

POLYESTER POLYOLS AND THEIR USE AS ANCHORING AGENTS FOR POLYMER SYSTEMS AND AS POLYMERIC PLASTICIZERS

This invention relates to new polyester polyols and to their use as anchoring agents (also referred to as "primers" or "bonding agents") for polymer systems and as polymeric plasticizers.

Polyester polyols as anchoring agents in combination with polyisocyanates are described, for example, in European patent application 0 150 803. The hydroxyl-functional polyesters described therein may be synthesized, for example, from adipic acid, hexane-1,6-diol and 1,1,1-trimethylol propane. The disadvantage of the polyesters described therein for use as anchoring agents is that they are difficult to handle and do not always have sufficient adhesive strength.

In addition to their use as anchoring agents in polymer systems, polyester polyols are also used as polymeric plasticizers. The polyester polyols used as polymeric plasticizers have a linear polymer structure and an OH functionality of $\leq 2$. The disadvantage of these polyester polyols used as polymeric plasticizers is their unsatisfactory resistance to migration and extraction.

The present invention relates to new polyester polyols having an acid value below 10, a hydroxyl value of 50 to 200, a hydroxyl functionality above 2, a number average molecular weight $M_n$ of 800 to 5,000, which are liquid at 23° C. or form a homogeneous (one-phase) solution in di-2-ethylhexyl phthalate (DOP) with a concentration of at least 70% by weight, the viscosity of the 70% solution being in the range from 1 to 35 Pa.s, and which are prepared from A) aliphatic $C_{6-10}$ dicarboxylic acids optionally containing aromatic dicarboxylic acids,
B) hexane-1,6-diol and optionally butane-1,4-diol and
C) one or more aromatic tricarboxylic acids, components A), B) and C) being present in a molar ratio of 1:1:(0.05–0.4) and preferably in a molar ratio of 1:1:(0.1–0.35). As shown in the examples which follow, the molar ratio of A), B) and C) is 1:1.59–2.08:0.11–0.33.

The polyester polyols according to the invention preferably have an acid value of 1 to 6 and, more preferably, 1.5 to 5. Their hydroxyl value is preferably from 60 to 150, their hydroxyl functionality is preferably from 2.1 to 3.5 and, more preferably, from 2.15 to 3.2 and their molecular weight is preferably in the range from 1,000 to 3,000.

Adipic acid, azelaic acid and/or sebacic acid are mentioned as examples of aliphatic $C_{6-10}$ dicarboxylic acids which may be used as component A).

Phthalic acid and/or isophthalic acid are mentioned as examples of aromatic dicarboxylic acids which may optionally be added to the aliphatic dicarboxylic acids. The corresponding anhydrides of the aromatic dicarboxylic acids may of course also be used.

The aromatic dicarboxylic acids may be added to the aliphatic dicarboxylic acids of component A) in quantities of up to 25 mol-% and preferably in quantities of 5 to 20 mol-%.

Butane-1,4-diol may be added to the hexane-1,6-diol as component B). The quantity of butane-1,4-diol added is up to 50 mol-% and is preferably from 5 to 35 mol-%.

Instead of butane-1,4-diol, the hexane-1,6-diol of component B) may contain up to 25 mol-% and preferably from 5 to 20 mol-% of a linear $C_3$ and/or $C_4$ alkanediol containing more than one primary or one secondary OH group per molecule or up to 30 mol-% and preferably from 5 to 25 mol-% of a branched $C_{5-8}$ alkanediol.

Preferred linear $C_{3-4}$ alkanediols are 1,2-propanol and/or butane-1,3-diol. Preferred branched $C_{5-8}$ alkanediols are 2,2-dimethylpropane-1,3-diol, 2-methyl-2-propylpropane-1,3-diol and/or 2-ethylhexane-1,3-diol.

Preferred aromatic tricarboxylic acids of component C) are 1,2,4-benzenetricarboxylic acid (trimellitic acid) and/or 1,3,5-benzenetricarboxylic acid (trimesic acid). The anhydride of trimellitic acid may of course also be used.

The aromatic tricarboxylic acids and the alkanediols added as part of component B) may be used in any quantitative ratio to one another. The most favorable quantitative ratio may be determined by suitable preliminary tests.

In the polyester polyols according to the invention, the hexane-1,6-diol B) may be completely replaced by butane-1,4-diol. In this case, however, component A) has to consist of at least two aliphatic dicarboxylic acids, the ratio of the dicarboxylic acids containing the smaller number of carbon atoms to the dicarboxylic acids containing the larger number of carbon atoms being from 90:10 to 30:70, and must additionally contain up to 40 mol-% and preferably from 5 to 30 mol-% branched $C_{5-8}$ alkanediols.

The polyester polyols according to the invention may be produced by known methods (see, for example, Ullmanns Encyklopädie der technischen Chemie, Vol. 14, Chapter entitled "Polyester", pages 80 et seq., edited by W. FOERST, Verlag URBAN & SCHWARZENBERG, München-Berlin, 1963).

The polyester polyols according to the invention are preferably produced by a two-stage melt condensation process, particularly where trimellitic anhydride is used.

The present invention also relates to the use of the new polyester polyols as anchoring agents for polymer systems, preferably in PVC plastisols and in aqueous polymer dispersions (see, for example EP-0 150 803). In combination with polyisocyanates (used in polymer systems), the polyester polyols according to the invention develop high bond strength on polyester, polyamide and other polymeric substrates.

In addition, the new polyester polyols may be used as polymeric plasticizers, showing high compatibility with monomeric plasticizers (for example dialkyl phthalates, alkyl sulfonic acid esters and trimellitic acid esters). The polyester polyols according to the invention show improved resistance to migration and extraction when used as polymeric plasticizers. The use of polyester polyols as polymeric plasticizers is described, for example, by H. Kittel in Lehrbuch der Lacke und Beschichtungen, Vol. III: Lösemittel, Weichmacher, Additive, Zwischenprodukte, Verlag W. A. Dolomb, 7274 Oberschwandorf (1976).

EXAMPLES

The invention is illustrated by the following Examples.

All the polyester polyols according to the invention were produced in a standard esterification reactor consisting of a four-necked glass flask equipped with a paddle stirrer, distillation column, thermometer and nitrogen connection. An oil bath was used for heating.

EXAMPLE 1

REACTION MIXTURE

| Component | Product used | Quantity (g) | n Mol |
| --- | --- | --- | --- |
| C 1 | Adipic acid | 731 | 5.0 |
| C 2 | Azelaic acid | 941 | 5.0 |
| C 3 | Hexane-1,6-diol | 1,900 | 16.1 |
| C 4 | Propane-1,2-diol | 213 | 2.8 |
| C 5 | Trimesic acid | 526 | 2.5 |

Procedure for the Melt Condensation

Components C 1 to C 5 were introduced into the reactor and heated in a stream of nitrogen to an internal temperature of 145° to 147° C. (beginning of condensation). At a temperature of 100° to 102° C. at the head of the distillation column, water was then distilled off over a period of 2.5 hours, after which the reaction mixture was esterified. The reaction mixture was then heated to 190° C. over a period of 2.5 hours and esterified for 15 hours under normal pressure at 190° C.±2° C. 506 g distillate 1 were obtained. Vacuum was then applied in stages and the reaction mixture was post-esterified for a total of 5 hours at 190° C.±2° C. under a maximum pressure of 18 mbar. The quantity of distillate amounted to 99 g.

The polyester polyol obtained is liquid at 23° C. It has an acid value of 3.9 mg KOH/g and a hydroxyl value of 114 mg KOH/g. A 70% solution of the polyester polyol in di-2-ethylhexyl phthalate has a viscosity of 6.5 Pa.s at 23° C.,

EXAMPLE 2

Reaction Mixture

| Component | Product used | Quantity (g) | n Mol |
| --- | --- | --- | --- |
| C 1 | Adipic acid | 1,023 | 7.0 |
| C 2 | Phthalic anhydride | 148 | 1.0 |
| C 3 | Hexane-1,6-diol | 1,250 | 10.6 |
| C 4 | 2,2-dimethylpropane-1,3-diol | 468 | 4.5 |
| C 5 | Trimellitic anhydride | 384 | 2.0 |

Procedure for Melt Condensation

Components C 1 to C 4 were introduced into the reaction vessel, heated under nitrogen over a period of 2 hours to an internal temperature of 159° C. and condensed under normal pressure. The transition temperature at the head of the distillation column was 100° to 102° C. The quantity of distillate 1 amounted to 186 g. 50% of C 2 (192 g trimellitic anhydride) were then introduced into the reaction vessel and esterification was continued for 1.75 hours at 160° to 170° C. 120 g distillate 2 distilled over. The remaining quantity (192 g) of C 5 was then added and the esterification temperature was increased from 170° C. to 190° C. over a period of 3 hours. Esterification was then continued for 14 hours under normal pressure at 190° C.±2° C. Distillate 3 accumulated in a quantity of 108 g. A vacuum was then applied in stages and the reaction mixture was post-esterified for 5 hours at 90° C.±2° C. under a maximum pressure of 18 mbar. 106 g distillate 4 were distilled off.

The polyester polyol obtained is liquid at 23° C. It has an acid value of 4.6 mg KOH/g and a hydroxyl value of 92 mg KOH/g. A 70% solution of the polyester polyol in di-2-ethylhexyl phthalate has a viscosity of 23.5 Pa.s at 23° C.

EXAMPLE 3

Reaction Mixture

| Component | Product used | Quantity (g) | n Mol |
| --- | --- | --- | --- |
| C 1 | Adipic acid | 1,023 | 7.0 |
| C 2 | Phthalic anhydride | 148 | 1.0 |
| C 3 | Hexane-1,6-diol | 1,782 | 15.1 |
| C 4 | Trimellitic anhydride | 384 | 2.0 |

The melt condensation of components C 1 to C 4 was carried out in the same way as in Example 2.

The polyester polyol obtained is liquid at 23° C. It has an acid value of 4.6 mg KOH/g and a hydroxyl value of 132 mg KOH/g. A 70% solution of the polyester polyol in di-2-ethylhexyl phthalate has a viscosity of 4.0 Pa.s at 23° C.

EXAMPLE 4

Reaction Mixture

| Component | Product used | Quantity (g) | n Mol |
| --- | --- | --- | --- |
| C 1 | Adipic acid | 1,096 | 7.5 |
| C 2 | Hexane-1,6-diol | 1,571 | 13.32 |
| C 3 | Propane-1,2-diol | 175 | 2.3 |
| C 4 | Trimellitic anhydride | 480 | 2.5 |

The melt condensation of components C 1 to C 4 was carried out as in Example 2.

The polyester polyol obtained is highly viscous and liquid at 23° C. It has an acid value of 1.8 mg KOH/g and a hydroxyl value of 122 mg KOH/g. A 70% solution of the polyester polyol in di-2-ethylhexyl phthalate has a viscosity of 8.0 Pa.s at 23° C.

EXAMPLE 5

Reaction Mixture

| Component | Product used | Quantity (g) | n Mol |
| --- | --- | --- | --- |
| C 1 | Adipic acid | 1,023 | 7.0 |
| C 2 | Phthalic anhydride | 148 | 1.0 |
| C 3 | Hexane-1,6-diol | 1,250 | 10.6 |
| C 4 | Butane-1,3-diol | 410 | 4.5 |
| C 5 | Trimellitic anhydride | 384 | 2.0 |

The melt condensation of components C 1 to C 5 was carried out as in Example 2.

The polyester polyol obtained is liquid at 23° C. It has an acid value of 3.2 mg KOH/g and a hydroxyl value of 122 mg KOH/g. A 70% solution of the polyester polyol in di-2-ethylhexyl phthalate has a viscosity of 5.4 Pa.s at 23° C.

EXAMPLE 6

Reaction Mixture

| Component | Product used | Quantity (g) | n Mol |
| --- | --- | --- | --- |
| C 1 | Adipic acid | 548 | 3.75 |
| C 2 | Azelaic acid | 830 | 3.75 |

-continued

| Component | Product used | Quantity (g) | n Mol |
|---|---|---|---|
| C 3 | Hexane-1,6-diol | 1,818 | 15.40 |
| C 4 | Trimesic acid | 525 | 2.5 |

The melt condensation of components C 1 to C 4 was carried out as in Example 1.

The polyester polyol obtained is liquid and highly viscous at 23° C. It has an acid value of 3.8 mg KOH/g and a hydroxyl value of 106 mg KOH/g. A 70% solution of the polyester polyol in di-2-ethylhexyl phthalate has a viscosity of 14.3 Pa.s at 23° C.

EXAMPLE 7

Reaction Mixture

| Component | Product used | Quantity (g) | n Mol |
|---|---|---|---|
| C 1 | Adipic acid | 1,169 | 8.0 |
| C 2 | Phthalic anhydride | 148 | 1.0 |
| C 3 | Hexane-1,6-diol | 1,192 | 10.1 |
| C 4 | Propane-1,2-diol | 328 | 4.23 |
| C 5 | Trimellitic anhydride | 192 | 1.0 |

The melt condensation of components C 1 to C 5 was carried out as in Example 2.

The polyester polyol obtained is liquid at 23° C. It has an acid value of 3.9 mg KOH/g and a hydroxyl value of 99 mg KOH/g. A 70% solution of the polyester polyol in di-2-ethylhexyl phthalate has a viscosity of 3.3 Pa.s at 23° C.

EXAMPLE 8

Reaction Mixture

| Component | Product used | Quantity (g) | n Mol |
|---|---|---|---|
| C 1 | Adipic acid | 1,023 | 7.0 |
| C 2 | Phthalic anhydride | 148 | 1.0 |
| C 3 | Hexane-1,6-diol | 1,250 | 10.6 |
| C 4 | 2 Methyl-2-propylpropane-1,3-diol | 410 | 4.5 |
| C 5 | Trimellitic anhydride | 384 | 2.0 |

The melt condensation of components C 1 to C 5 was carried out as in Example 2.

The polyester polyol obtained is liquid at 23° C. It has an acid value of 4.7 mg KOH/g and a hydroxyl value of 125 mg KOH/g. A 70% solution of the polyester polyol in di-2-ethylhexyl phthalate has a viscosity of 5.9 Pa.s at 23° C.

EXAMPLE 9

Reaction Mixture

| Component | Product used | Quantity (g) | n Mol |
|---|---|---|---|
| C 1 | Adipic acid | 1,169 | 8.0 |
| C 2 | Phthalic anhydride | 148 | 1.0 |
| C 3 | Hexane-1,6-diol | 1,192 | 10.1 |
| C 4 | 2-Ethylhexane-1,3-diol | 629 | 4.3 |
| C 5 | Trimesic acid | 210 | 1.0 |

The melt condensation of components C 1 to C 5 was carried out as in Example 1.

The polyester polyol obtained is liquid at 23° C. It has an acid value of 2.0 mg KOH/g and a hydroxyl value of 114 mg KOH/g. A 70% solution of the polyester polyol in di-2-ethylhexyl phthalate has a viscosity of 1.9 Pa.s at 23° C.

EXAMPLE 10

Reaction Mixture

| Component | Product used | Quantity (g) | n Mol |
|---|---|---|---|
| C 1 | Adipic acid | 585 | 4.0 |
| C 2 | Azelaic acid | 885 | 4.0 |
| C 3 | Phthalic anhydride | 148 | 1.0 |
| C 4 | Hexane-1,6-diol | 410 | 10.1 |
| C 5 | Butane-1,3-diol | 1,192 | 4.3 |
| C 6 | Trimesic acid | 210 | 1.0 |

The melt condensation of components C 1 to C 6 was carried out as in Example 1.

The polyester polyol obtained is liquid at 23° C. It has an acid value of 4.2 mg KOH/g and a hydroxyl value of 96 mg KOH/g. A 70% solution of the polyester polyol in di-2-ethylhexyl phthalate has a viscosity of 2.7 Pa.s at 23° C.

EXAMPLE 11

Reaction Mixture

| Component | Product used | Quantity (g) | n Mol |
|---|---|---|---|
| C 1 | Adipic acid | 1,023 | 7.0 |
| C 2 | Phthalic anhydride | 148 | 1.0 |
| C 3 | Hexane-1,6-diol | 1,251 | 10.6 |
| C 4 | 2-Ethylhexane-1,3-diol | 658 | 4.5 |
| C 5 | Trimellitic anhydride | 384 | 2.0 |

The melt condensation of components C 1 to C 5 was carried out as in Example 2.

The polyester polyol obtained is liquid at 23° C. It has an acid value of 3.1 mg KOH/g and a hydroxyl value of 129 mg KOH/g. A 70% solution of the polyester polyol in di-2-ethylhexyl phthalate has a viscosity of 4.2 Pa.s at 23° C.

EXAMPLE 12

Reaction Mixture

| Component | Product used | Quantity (g) | n Mol |
|---|---|---|---|
| C 1 | Adipic acid | 512 | 3.5 |
| C 2 | Azelaic acid (85%) | 775 | 3.5 |
| C 3 | Phthalic anhydride | 148 | 1.0 |
| C 4 | Hexane-1,6-diol | 1,781 | 15.1 |
| C 5 | Trimesic acid | 420 | 2.0 |

The melt condensaton was carried out as in Example 1.

The polyester polyol obtained is liquid at 23° C. It has an acid value of 4.4 mg KOH/g and a hydroxyl value of 111 mg KOH/g. A 70% solution of the polyester polyol in di-2-ethylhexyl phthalate has a viscosity of 5.8 Pa.s at 23° C.

EXAMPLE 13

Reaction Mixture

| Component | Product used | Quantity (g) | n Mol |
| --- | --- | --- | --- |
| C 1 | Adipic acid | 512 | 3.5 |
| C 2 | Azelaic acid (85%) | 775 | 3.5 |
| C 3 | Phthalic anhydride | 148 | 1.0 |
| C 4 | Hexane-1,6-diol | 1,510 | 12.8 |
| C 5 | Propane-1,2-diol | 175 | 2.3 |
| C 6 | Trimesic acid | 420 | 2.0 |

The melt condensation of components C 1 to C 6 was carried out as in Example 1.

The polyester polyol obtained is liquid at 23° C. It has an acid value of 3.0 mg KOH/g and a hydroxyl value of 94 mg KOH/g. A 70% solution of the polyester polyol in di-2-ethylhexyl phthalate has a viscosity of 12.0 Pa.s at 23° C.

EXAMPLE 14

Reaction Mixture

| Component | Product used | Quantity (g) | n Mol |
| --- | --- | --- | --- |
| C 1 | Adipic acid | 658 | 4.5 |
| C 2 | Azelaic acid (85%) | 996 | 4.5 |
| C 3 | Butane-1,4-diol | 911 | 10.1 |
| C 4 | Neopentyl glycol | 447 | 4.3 |
| C 5 | Trimellitic anhydride | 192 | 1.0 |

The melt condensation of components C 1 to C 5 was carried out as in Example 2.

The polyester polyol obtained is liquid at 23° C. It has an acid value of 4.6 mg KOH/g and a hydroxyl value of 83 mg KOH/g. A 70% solution of the polyester polyol in di-2-ethylhexyl phthalate has a viscosity of 5.6 Pa.s at 23° C.

EXAMPLE 15

Reaction Mixture

| Component | Product used | Quantity (g) | n Mol |
| --- | --- | --- | --- |
| C 1 | Adipic acid | 585 | 4.0 |
| C 2 | Azelaic acid (85%) | 885 | 4.0 |
| C 3 | Phthalic anhydride | 148 | 1.0 |
| C 4 | Butane-1,4-diol | 911 | 10.1 |
| C 5 | Neopentyl glycol | 447 | 4.3 |
| C 6 | Trimesic acid | 210 | 1.0 |

The melt condensation of components C 1 to C 6 was carried out as in Example 1.

The polyester polyol obtained is liquid at 23° C. It has an acid value of 4.3 mg KOH/g and a hydroxyl value of 69 mg KOH/g. A 70% solution of the polyester polyol in di-2-ethylhexyl phthalate has a viscosity of 11.3 Pa.s at 23° C.

EXAMPLE 16

Reaction Mixture

| Component | Product used | Quantity (g) | n Mol |
| --- | --- | --- | --- |
| C 1 | Adipic acid | 1,023 | 7.0 |
| C 2 | Phthalic anhydride | 148 | 1.0 |
| C 3 | Hexane-1,6-diol | 1,546 | 13.1 |
| C 4 | Neopentyl glycol | 208 | 2.0 |
| C 5 | Trimesic acid | 210 | 1.0 |
| C 6 | Trimellitic anhydride | 192 | 1.0 |

Procedure for the Melt Condensation

Components C 1 to C 5 and ⅓rd C 6 were introduced into the reaction vessel (Example 2) and esterified for 1.5 hours under normal pressure at an internal temperature of 148° to 160° C. (distillate 1 = 183 g). The remaining ⅔rds C 6 were then added and the temperature was increased from 158° C. to 190° C. over a period of 2.5 hours. Esterification was then continued for 15 hours under normal pressure at 190° C.±2° C. (distillate 2 = 178 g). A vacuum was then applied in stages and the reaction mixture was post-esterified for 5 hours at 190° C.±2° C./20 mbar (distillate 3 = 77 g).

The polyester polyol obtained is liquid at 23° C. It has an acid value of 4.3 mg KOH/g and a hydroxyl value of 123 mg KOH/g. A 70% solution of the polyester polyol in di-2-ethylhexyl phthalate has a viscosity of 5.9 Pa.s at 23° C.

EXAMPLE 17 (COMPARISON EXAMPLE 1)

Reaction Mixture

| Component | Product used | Quantity (g) | n Mol |
| --- | --- | --- | --- |
| C 1 | Adipic acid | 1,169 | 8.0 |
| C 2 | Hexane-1,6-diol | 944 | 8.0 |
| C 3 | 1,1,1-Trimethylol propane | 268 | 2.0 |

The melt condensation (C 1–C 3) was carried out as in Example 1.

The polyester polyol obtained is solid and wax-like at 23° C. It has an acid value of 4.2 mg KOH/g and a hydroxyl value of 157 mg KOH/g. The polyester polyol is not homogeneously soluble in di-2-ethylhexyl phthalate. An attempt to prepare a 70% solution results in the formation of two layers consisting of the polyester polyol and DOP.

To evaluate adhesive strength, therefore, a 70% solution of the polyester polyol in ethyl acetate had to be prepared. The results are shown in Table 1.

EXAMPLE 18 (COMPARISON EXAMPLE 2)

Reaction Mixture

| Component | Product used | Quantity (g) | n Mol |
| --- | --- | --- | --- |
| C 1 | Adipic acid | 1,169 | 8.0 |
| C 2 | Phthalic anhydride | 296 | 2.0 |
| C 3 | Hexane-1,6-diol | 354 | 3.0 |
| C 4 | Propane-1,2-diol | 533 | 7.0 |
| C 5 | 1,1,1-Trimethylol propane | 335 | 2.5 |

The melt condensation (C 1–C 5) was carried out as in Example 1.

The polyester polyol obtained is highly viscous at 23° C. It has an acid value of 1.8 mg KOH/g and a hydroxyl value of 153 mg KOH/g. The polyester polyol is not homogeneously soluble in di-2-ethylhexyl phthalate, forming two layers instead.

To evaluate adhesive strength, therefore, a 70% solution of the polyester polyol in dibutyl phthalate was prepared. The results are shown in Table 1.

EXAMPLE 19

This Example shows the good adhesive strengths of PVC coatings produced with the polyester polyols according to the invention.

A PVC plastisol is prepared from 300 g PVC, paste type (K value 70, according to DIN 53 726)

300 g PVC, paste type (K value 80, according to DIN 53 726)

200 g $C_{10-18}$ alkanesulfonic acid phenyl ester 200 g di-2-ethylhexyl phthalate 60 g kaolin 20 g dibasic lead phosphite 10 g chromium oxide green pigment.

A homogeneous PVC plastisol is obtained by grinding twice on a three-roll mill and is subsequently aged for 24 hours at 23° C.

Quantities of 7 g of the polyester polyols according to the invention (70% in di-2-ethylhexyl phthalate (DOP)) of Examples 1 to 16 and 6 g Desmodur L75 ® (polyfunctional isocyanate, a product of Bayer AG) were added to and homogeneously stirred with 100 g of the PVC plastisol thus prepared.

The individual mixtures were then knife-coated in a quantity of 100 g/m² onto test fabrics of polyester (1,100 dtex, weave L 1/1, spacing 9/9 fil./cm) and of polyamide-6,6 (940 dtex, weave L 1/1, spacing 8.5/9.5 fil./cm) and gelled for 1 minute at 140° C. in a recirculating air drying cabinet heated with hot air.

A top coat of the above-mentioned PVC plastisol with no polyol or isocyanate component was then applied to this anchor coating, again by knife-coating, and the two coatings were allowed to gel at 180° C. in a recirculating air drying cabinet.

5 cm wide and 20 cm long test specimens were then punched out from the coating and tested for adhesive strength in accordance with DIN 53 357. The results are shown in Table 1.

TABLE 1

| Additions to 100 g PVC plastisol 7 g polyester polyol (70% in DOP) of Examples 1-16 | | Adhesive strength (N/5 cm) on | |
|---|---|---|---|
| 6 g Desmodur L 75 | | Polyester | Polyamide- |
| No. | Polyester polyol of Example No. | 1,100 dtex | 6,6 940 dtex |
| a | Without additives (cf. Example) | 45 | 35 |
| b | Example 1 | 205 | 175 |
| c | 2 | 230 | 225 |
| d | 3 | 165 | 160 |
| e | 4 | 160 | 155 |
| f | 5 | 150 | 135 |
| g | 6 | 250 | 240 |
| h | 7 | 165 | 140 |
| i | 8 | 155 | 145 |
| k | 9 | 145 | 125 |
| l | 10 | 225 | 190 |
| m | 11 | 160 | 135 |
| n | 12 | 155 | 130 |
| o | 13 | 240 | 210 |
| p | 14 | 190 | 145 |
| q | 15 | 230 | 195 |
| r | 16 | 160 | 165 |
| s | Example 17 (Comp. Ex. 1) (70% in ethyl acetate) | 110 | 120 |
| t | Example 18 (Comp. Ex. 2) (70% in dibutyl phthalate) | 60 | 75 |

It can clearly be seen that, both on polyester and on polyamide-6,6 fabrics, considerably improved adhesive strengths are achieved with all the polyester polyols according to the invention (Nos. b–r) than in the Example with no addition of anchoring agent (No. a) or in Examples 17 (No. s) and 18 (No. t).

We claim:

1. Polyester polyols having an acid value below 10, a hydroxyl value of 50 to 200, a hydroxyl functionality above 2, a number average molecular weight $M_n$ of 800 to 5,000, which are liquid at 23° C. or form a homogeneous (one-phase) solution in di-2-ethylhexyl phthalate (DOP) with a concentration of at least 70% by weight, the viscosity of the 70% solution being in the range of from 1 to 35 Pa.s, and which are prepared from A) aliphatic $C_{6-10}$ dicarboxylic acids, B) hexane-1,6-diol and optionally butane-1,4-diol and C) one or more aromatic tricarboxylic acids, components A), B) and C) being present in a molar ratio of 1:1.59–2.08:0.11–0.33.

2. Polyester polyols having an acid value below 10, a hydroxyl value of 50 to 200, a hydroxyl functionality above 2, a number average molecular weight $M_n$ of 800 to 5,000, which are liquid at 23° C. or form a homogeneous (one-phase) solution in di-2-ethylhexyl phthalate (DOP) with a concentration of at least 70% by weight, the viscosity of the 70% solution being in the range from 1 to 35 Pa.s, and which are prepared from A) a mixture aliphatic $C_{6-10}$ dicarboxylic acids and aromatic dicarboxylic acids, the mixture containing up to 25 mol-% of aromatic dicarboxylic acids, B) hexane-1,6-diol and optionally butane-1,4-diol and C) one or more aromatic tricarboxylic acids, components A), B) and C) being present in a molar ratio of 1:1.59–2.08:0.11–0.33.

3. Polyester polyols having an acid value below 10, a hydroxyl value of 50 to 200, a hydroxyl functionality above 2, a number average molecular weight $M_n$ of 800 to 5,000, which are liquid at 23° C. or form a homogeneous (one-phase) solution in di-2-ethylhexyl phthalate (DOP) with a concentration of at least 70% by weight, the viscosity of the 70% solution being in the range of from 1 to 35 Pa.s, and which are prepared from A) at least two aliphatic dicarboxylic acids, the molecular ratio of the dicarboxylic acids with the smaller number of carbon atoms to the dicarboxylic acids with the larger number of carbon atoms being 90:10 to 30:70, B) a mixture of butane-1,4-diol and branched $C_{5-8}$ alkanediols, the mixture of diols containing up to 40 mol-% of the branched $C_{5-8}$ alkanediols, and C) one or more aromatic tricarboxylic acids, components A), B) and C) being present in a molar ratio of 1:1.59–2.08:0.11–0.33.

4. A primer comprising the polyester polyols of claim 1.

5. A primer comprising the polyester polyols of claim 2.

6. A primer comprising the polyester polyols of claim 3.

7. A plasticizer comprising the polyester polyols of claim 1.

8. A plasticizer comprising the polyester polyols of claim 2.

9. A plasticizer comprising the polyester polyols of claim 3.

10. Polyester polyols as claimed in claim 1, wherein component A) is one or more of adipic acid, azelaic acid, or sebacic acid, and wherein component C) is trimesic acid, trimellitic acid, or mixtures thereof.

11. Polyester polyols as claimed in claim 2, wherein the aliphatic acids of component A) are one or more of adipic acid, azeleic acid, or sebacic acid, the aromatic acids of component A) are selected from one or more of phthalic acid or isophthalic acid, and wherein component C) is trimesic acid, trimellitic acid, or mixtures thereof.

12. Polyester polyols as claimed in claim 3, wherein component A) is one or more of adipic acid, azelaic acid, or sebacic acid, and wherein component C) is trimesic acid, trimellitic acid, or mixtures thereof.

* * * * *